UNITED STATES PATENT OFFICE.

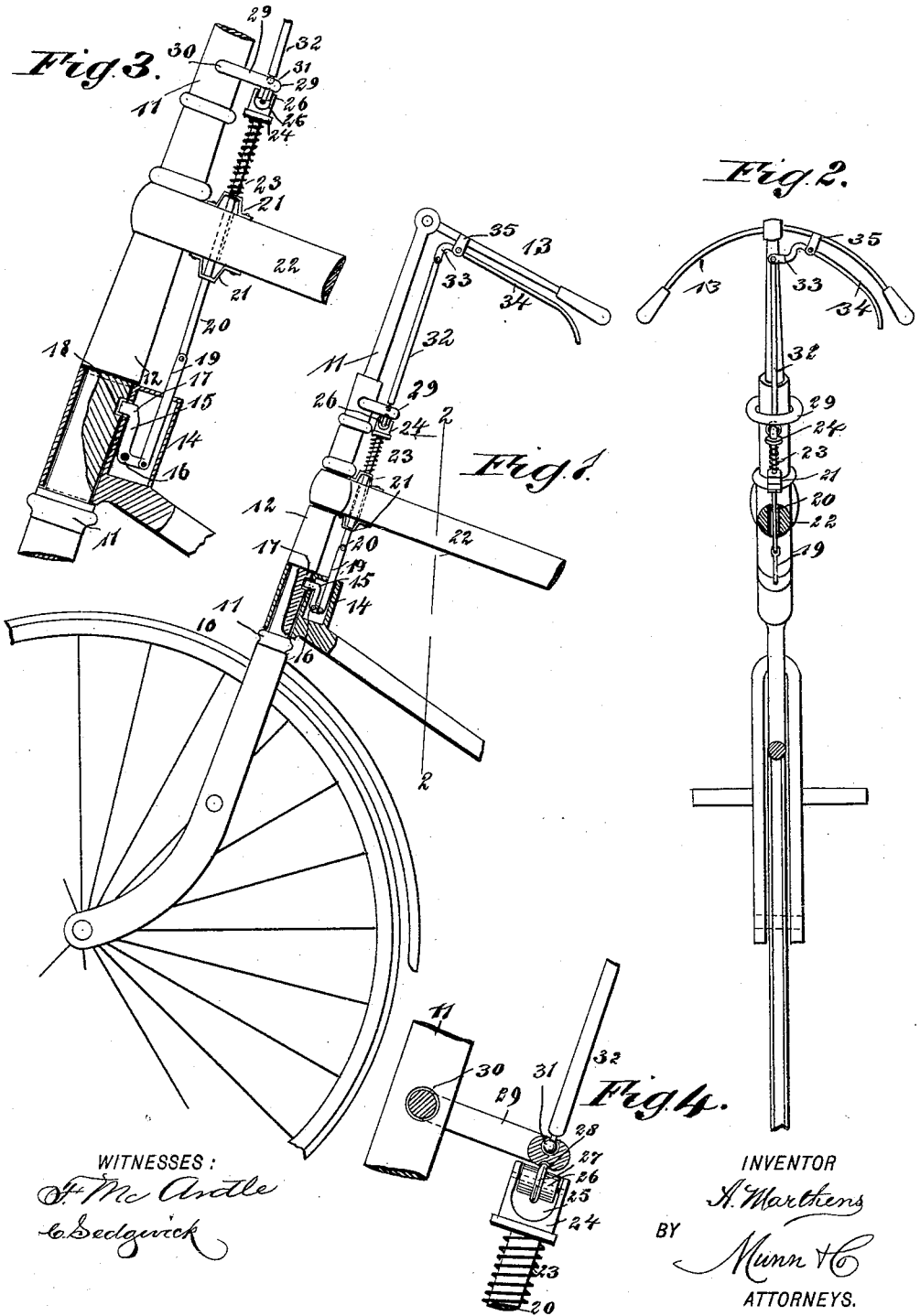

ALLEN MARTHENS, OF PITTSBURG, PENNSYLVANIA.

BICYCLE ATTACHMENT.

SPECIFICATION forming part of Letters Patent No. 487,577, dated December 6, 1892.

Application filed June 21, 1892. Serial No. 437,482. (No model.)

*To all whom it may concern:*

Be it known that I, ALLEN MARTHENS, of Pittsburg, in the county of Allegheny and State of Pennsylvania, have invented new and Improved Bicycle Attachments, of which the following is a full, clear, and exact description.

My invention relates to improvements in attachments for bicycles of all kinds. In riding a bicycle there is a tendency of the front or steering wheel to wabble, the movement from side to side being occasioned by the pressure of the rider's foot first on one pedal and then on the other, and this tendency is so marked that only an expert rider can drive his bicycle in a perfectly-straight line. To propel the bicycle in an approximately-straight line requires an ordinary rider to grip and pay close attention to the handle-bars and use more or less muscular effort. Bicycles as at present constructed are especially bad for beginners, as when mounting or dismounting the steering-wheel is apt to turn very suddenly, first one way and then the other.

The object of my invention is to obviate these difficulties, which result I accomplish by providing a simple device which will automatically lock the steering-fork, so that the steering-wheel cannot move laterally, and which device may also be readily released when necessary, so as to bring the steering-wheel under the complete control of the rider.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation, partly in section, of a bicycle provided with my improved attachments. Fig. 2 is a sectional end view on the line 2 2 in Fig. 1. Fig. 3 is an enlarged detail view, partly in section, of the locking mechanism; and Fig. 4 is an enlarged detail section of the bearing-roller, the ring which slides upon it, and the slide-bolt which connects with the ring.

The bicycle 10 is of the common "safety" kind, but the attachments may be secured to any bicycle or to a tricycle if desired. The bicycle has the usual steering-fork 11, which is held to turn in a sleeve 12, carried by the bicycle-frame, and which terminates at its upper end in the handle-bars 13. At the lower end of the sleeve 12 and on the back side thereof is a small casing 14, in which is held an elbow locking lever or latch 15, this lever being pivoted at its lower elbow, as shown at 16, and it has an upper forwardly-bent end 17, which projects through a hole in the sleeve and enters a recess 18 in the steering-fork 11, as best shown in Fig. 3. It will be noticed that when the latch is in engagement with the fork the fork will be held rigid in relation to the sleeve.

The lower arm of the lever or latch 15 is pivoted to an upwardly-extending rod 19, which at its upper end is pivoted to another rod 20, and the latter is held to slide up and down in guides 21 and through a hole in a part of the bicycle-frame 22. The rod 20 is normally pressed upwardly by a spring 23, arranged between the upper guide 21 and a keeper 24, which is secured to the rod, and the pressure of the spring holds the latch 15 in engagement with the steering-fork. The keeper 24 has a recess 25 in its upper side, in which is journaled a roller 26, and the roller has a central circumferential enlargement or boss 27, which fits in a recess 28 in the under side of a ring 29, the latter being hinged to the steering-fork, as shown at 30 in Fig. 4, and extending rearwardly from the fork.

On the upper side of the ring 29 and connected therewith by a ball-joint 31 is a slide-bolt 32, which extends upward parallel with the fork 11, and this bolt at the top is pivoted to the bent end 33 of a lever 34, this lever being fulcrumed in lugs 35 on one of the handle-bars 13, and the lever extends outward beneath and parallel with the handle-bar and terminates adjacent to one of the handles of the bar. It will be seen, then, that by pressing upon the outer end of the lever 34—that is, by forcing it against the handle-bar—the inner end of the lever is thrown downward, thus depressing the slide-bolt 32 and the rods 20 and 19 and tilting the latch 15, so as to throw it out of engagement with the steering-fork. When this is done, the steering-fork and the front wheel may be manipulated in the usual way; but under ordinary circumstances the latch will be held in engagement with the fork and consequently when the machine is moved it will be so in a straight line.

When the latch is to be disconnected from the fork, the lever 34 is pressed against the handle-bar, as described, and then when the fork is turned the ring 29 will ride easily on the roller 26 without disturbing the locking mechanism below.

Having thus described my invention, I claim as new and desire to secure by Letters Patent—

1. In combination, the frame, the steering-fork and its retaining-sleeve, a spring-actuated lock normally engaging such fork to hold it from rotation in its sleeve, said lock having a vertically-projecting arm held from lateral movement, a laterally-movable swinging bearing member carried by the fork and engaging the lock-rod, and an operating-lever engaging said bearing, all substantially as and for the purpose described.

2. The combination, with the bicycle, its recessed steering-fork, and the sleeve containing the fork and having a hole opposite the recess, of an elbow-latch pivoted behind the sleeve and adapted to enter the hole in the recess, a spring-pressed rod connected with the latch and extending upward nearly parallel with the fork, a roller carried at the upper end of the rod, a ring hinged to the fork and adapted to press upon the roller, a slide-bolt connected to the ring and extending upwardly therefrom, and a releasing-lever fulcrumed on one of the handle-bars and pivotally connected with the slide-bolt, substantially as described.

3. The combination, with a bicycle, its recessed steering-fork, the sleeve containing the fork and having a hole opposite the recess, and the elbow-latch pivoted behind the sleeve and adapted to enter the hole and recess, of a spring-pressed rod nearly parallel with the fork and connected with one arm of the latch, a keeper at the upper end of the rod, a roller journaled in the keeper and having a central circumferential boss thereon, a ring hinged to the fork and having a groove to receive the boss of the roller, a slide-bolt connected with the ring, and a lever fulcrumed on one of the handle-bars and pivoted to the slide-bolt, substantially as described.

ALLEN MARTHENS.

Witnesses:
G. N. MASHY,
WM. OSTERMAIER.